(12) United States Patent
Fang et al.

(10) Patent No.: US 10,964,004 B2
(45) Date of Patent: Mar. 30, 2021

(54) AUTOMATED OPTICAL INSPECTION METHOD USING DEEP LEARNING AND APPARATUS, COMPUTER PROGRAM FOR PERFORMING THE METHOD, COMPUTER-READABLE STORAGE MEDIUM STORING THE COMPUTER PROGRAM, AND DEEP LEARNING SYSTEM THEREOF

(71) Applicant: UTECHZONE CO., LTD., New Taipei (TW)

(72) Inventors: Chih-Heng Fang, New Taipei (TW); Chia-Liang Lu, New Taipei (TW); Ming-Tang Hsu, New Taipei (TW); Arulmurugan Ambikapathi, New Taipei (TW); Chien-Chung Lin, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 56 days.

(21) Appl. No.: 16/220,649

(22) Filed: Dec. 14, 2018

(65) Prior Publication Data

US 2019/0197679 A1    Jun. 27, 2019

(30) Foreign Application Priority Data

Dec. 25, 2017  (TW) .................... 106145566

(51) Int. Cl.
*G06T 7/00*    (2017.01)
*G06N 3/08*    (2006.01)
(Continued)

(52) U.S. Cl.
CPC ......... *G06T 7/0002* (2013.01); *G06N 3/0454* (2013.01); *G06N 3/084* (2013.01);
(Continued)

(58) Field of Classification Search
CPC ...... G06N 3/0454; G06N 3/084; G06N 5/046; G06T 2207/20081; G06T 2207/20084;
(Continued)

(56) References Cited

U.S. PATENT DOCUMENTS 7,079,235 B2    7/2006 Lehman
10,346,969 B1 *  7/2019 Raghu .................. G06K 9/4604
(Continued)

FOREIGN PATENT DOCUMENTS

CN    106845549 A    6/2017
CN    106991368 A    7/2017
(Continued)

OTHER PUBLICATIONS

A. K. Aniyan et al; "Classifying Radio Galaxies with the Convolutional Neural Network" The Astrophysical Journal Supplement Series; Jun. 2017; pp:1-15.

*Primary Examiner* — Ian L Lemieux
(74) *Attorney, Agent, or Firm* — Muncy, Geissler, Olds & Lowe, P.C.

(57) ABSTRACT

The present invention is an automated optical inspection method using deep learning, comprising the steps of: providing a plurality of paired image combinations, wherein each said paired image combination includes at least one defect-free image and at least one defect-containing image corresponding to the defect-free image; providing a convolutional neural network to start a training mode of the convolutional neural network; inputting the plurality of paired image combinations into the convolutional neural network, and adjusting a weight of at least one fully connected layer of the convolutional neural network through backpropagation to complete the training mode of the convolutional neural network; and performing an optical inspection process using the trained convolutional neural network.

11 Claims, 8 Drawing Sheets

(51) Int. Cl.
*G06N 5/04* (2006.01)
*G06N 3/04* (2006.01)

(52) U.S. Cl.
CPC .............. *G06N 5/046* (2013.01); *G06T 7/97* (2017.01); *G06T 2207/20081* (2013.01)

(58) Field of Classification Search
CPC . G06T 2207/30141; G06T 2207/30148; G06T 7/0002; G06T 7/0004; G06T 7/97
See application file for complete search history.

(56) References Cited

U.S. PATENT DOCUMENTS

| | | | | |
|---|---|---|---|---|
| 2016/0163035 A1* | 6/2016 | Chang | .................. | G06T 7/0004 382/149 |
| 2016/0358070 A1 | 12/2016 | Brothers et al. | | |
| 2017/0140524 A1* | 5/2017 | Karsenti | .............. | G06K 9/6269 |
| 2017/0191948 A1* | 7/2017 | Gao | ................. | G01N 21/95607 |
| 2017/0289409 A1* | 10/2017 | Min | .................... | G06K 9/00718 |
| 2017/0345140 A1* | 11/2017 | Zhang | .................... | G06T 7/0004 |
| 2017/0351952 A1 | 12/2017 | Zhang et al. | | |
| 2018/0107928 A1* | 4/2018 | Zhang | .................. | G06N 3/0454 |
| 2018/0253836 A1* | 9/2018 | Huang | ................. | G06K 9/6274 |
| 2018/0268256 A1* | 9/2018 | Di Febbo | ............. | G06K 9/6211 |
| 2018/0268257 A1* | 9/2018 | Ren | ......................... | G06T 7/001 |
| 2018/0341248 A1* | 11/2018 | Mehr | .................... | B33Y 50/02 |
| 2019/0287235 A1* | 9/2019 | Ikeda | .................... | G06T 7/0008 |
| 2019/0303717 A1* | 10/2019 | Bhaskar | ................ | G06K 9/6256 |
| 2019/0362490 A1* | 11/2019 | Wen | ........................ | G06T 7/0004 |
| 2020/0005070 A1* | 1/2020 | Ambikapathi | ....... | G06K 9/4604 |
| 2020/0311895 A1* | 10/2020 | Sakurai | .................. | G06T 5/009 |

FOREIGN PATENT DOCUMENTS

| | | | | |
|---|---|---|---|---|
| TW | 201734825 A | 1/2017 | | |
| TW | I582721 B | 5/2017 | | |
| WO | WO-2018165753 A1 * | 9/2018 | ............... | G06N 3/08 |

* cited by examiner

AUTOMATED OPTICAL INSPECTION METHOD USING DEEP LEARNING AND APPARATUS, COMPUTER PROGRAM FOR PERFORMING THE METHOD, COMPUTER-READABLE STORAGE MEDIUM STORING THE COMPUTER PROGRAM, AND DEEP LEARNING SYSTEM THEREOF

BACKGROUND OF THE INVENTION

1. Technical Field

The present invention relates to an automated optical inspection method and apparatus, a computer program for performing the method, and a computer-readable storage medium storing the computer program. More particularly, the invention relates to an automated optical inspection method using deep learning and apparatus, a computer program for performing the method, a computer-readable storage medium storing the computer program, and a deep learning system thereof.

2. Description of Related Art

Deep learning has various applications, the most common examples of which are image recognition, speech recognition, and natural language processing. In fact, deep learning has been applied to almost every field that is related to our daily lives, even including recommender systems and biomedical informatics. Image recognition, in particular, is the area in which deep learning has been used the most extensively and reached the highest technical maturity.

To prevent human errors in optical inspection, artificial intelligence and machine learning are typically used in place of visual inspection to minimize misjudgment. In computer vision for example, deep learning is nowadays applied to AlexNet, GoogleNet, VGG-Net, and deep residual learning, in which VGG-Net has the highest precision in machine vision-based inspection because a VGG network can enhance its precision to a certain extent by increasing the network depth. Despite its precision and better results, however, any deep learning network is disadvantageous in that its training process requires a huge number of samples to be input and is therefore extremely time-consuming, that in consequence it takes much longer time to train a deep learning-based model, and that the resulting model has a relatively large amount of data.

BRIEF SUMMARY OF THE INVENTION

The primary objective of the present invention is to provide a training method for deep learning that can increase the filtration rate of false defects effectively, reduce the training time and the number of samples required, and decrease the amount of data of the resulting model.

To obtain the above objective, the present invention provides an automated optical inspection method using deep learning, comprising the steps of: providing a plurality of paired image combinations, wherein each said paired image combination includes at least one defect-free image and at least one defect-containing image corresponding to the defect-free image; providing a convolutional neural network to start a training mode of the convolutional neural network; inputting the plurality of paired image combinations into the convolutional neural network, and adjusting a weight of at least one fully connected layer of the convolutional neural network through backpropagation to complete training of the convolutional neural network; and performing an optical inspection process using the trained convolutional neural network.

Further, the convolutional neural network performs the following steps: selecting a feature image from the input paired image combinations through a plurality of convolutional layers; processing the selected feature image with rectified linear units so that certain pixels in the feature image are output as 0; performing pooling on the processed feature image in order to compress and thereby simplify the processed feature image; and processing the compressed feature image with the fully connected layer in order to classify the compressed feature image according to the weights, and normalizing a classification result to obtain an inspection result.

The another objective of the present invention is to provide an automated optical inspection apparatus for performing the above automated optical inspection method using deep learning, comprising: an image-capture device for obtaining images of a workpiece; and a computation device coupled to the image-capture device and configured to perform the optical inspection process on the workpiece using the trained convolutional neural network.

The another objective of the present invention is to provide a deep learning system, comprising: one or a plurality of feature extractors, wherein each said feature extractor includes one or a plurality of convolutional layers, one or a plurality of rectified linear units, and one or a plurality of pooling layers in order to perform feature enhancement and image compression; one or a plurality of fully connected layers for performing classification according to a weight of each said fully connected layer.

The another objective of the present invention is to provide a computer program to be installed on a computer in order to perform the above automated optical inspection method using deep learning.

The another objective of the present invention is to provide a computer-readable storage medium storing a computer program to be installed on a computer in order to perform the above automated optical inspection method using deep learning.

The present invention can effectively increase the filtration rate of false defects in a deep learning process, shorten the training time, minimize the number of samples required, and reduce the amount of data of the resulting model. The invention is also effective in increasing the defect detection rate and accuracy of optical inspection and can thereby enhance inspection efficiency and lower the associated costs.

DETAILED DESCRIPTION OF THE INVENTION

The details and technical solution of the present invention are hereunder described with reference to accompanying drawings.

The present invention is applicable to an automated optical inspection (AOI) apparatus that performs surface defect detection on semiconductor devices, wafers, display panels, circuit boards (e.g., PCBs, FPCs, and ceramic circuit boards), or other workpieces.

Figure 1:
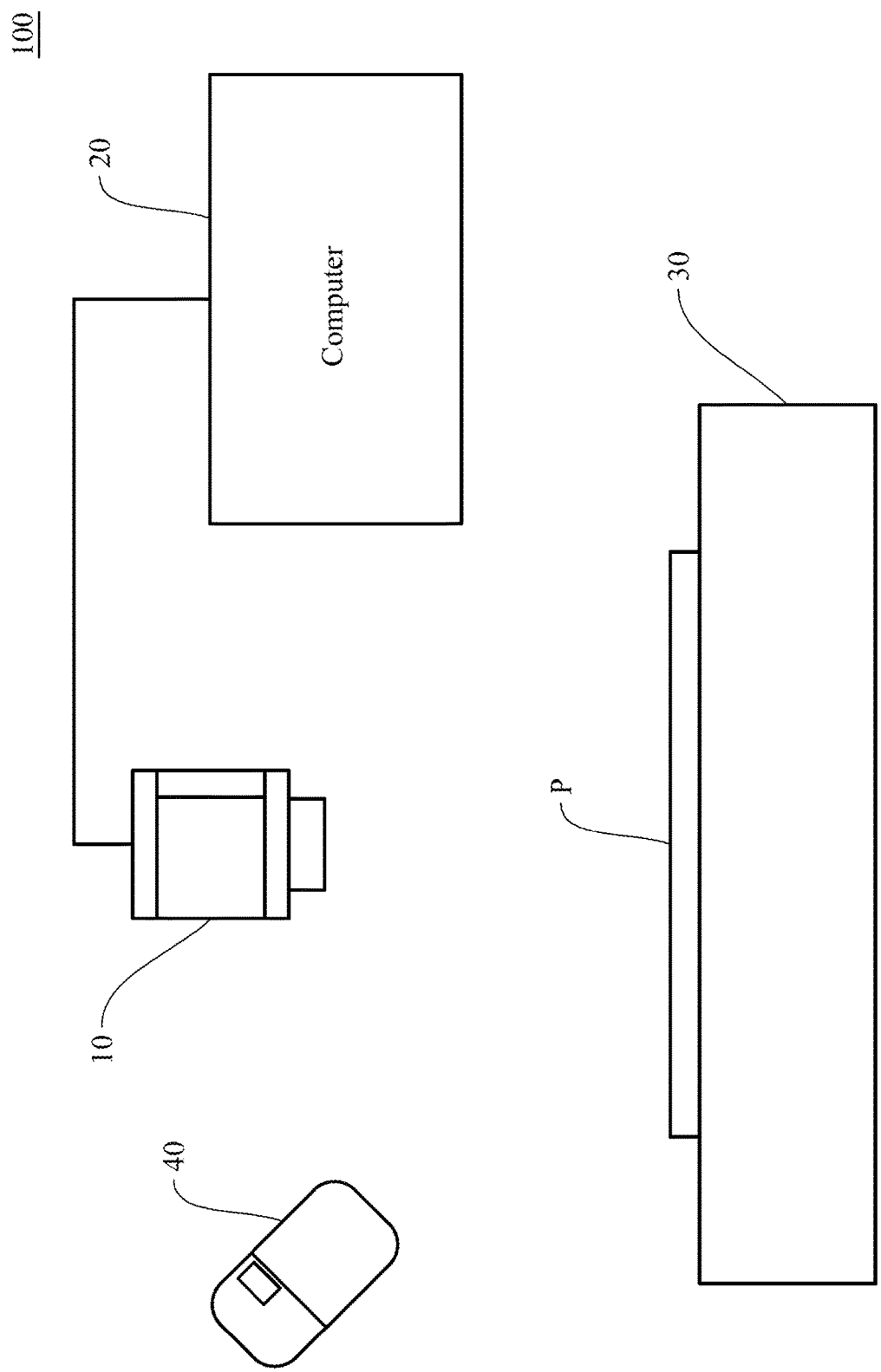
FIG. 1 is a block diagram of an automated optical inspection apparatus according to the present invention.

FIG. 1 shows the structure of an automated optical inspection apparatus 100, which is composed essentially of a camera 10 and an image-processing device (i.e., a computer 20) connected to the camera 10. A carrier 30 is generally also provided to enable fully automated inspection. The carrier 30 can carry an object P to an inspection area in order for the camera 10, which is provided on one side of the inspection area, to take images of the object P and for the images obtained of the object P to be analyzed.

Generally, the automated optical inspection apparatus 100 is mounted with at least one auxiliary light source 40 for illuminating the object P. Such auxiliary light sources 40 include lamps for emitting collimated light, lamps for emitting diffused light, dome lamps, and so on. Two or more auxiliary light sources 40 may be required at the same time, depending on the type of the object P.

The camera 10 used in automated optical inspection is selected according to practical needs. When certain requirements are imposed on the precision and reliability of the workpiece to be inspected, a high-precision camera is called for. Conversely, a low-end camera may be used to reduce equipment cost. In short, the choice of the camera is at the user's discretion. The camera 10 can be generally categorized as an area scan camera or a line scan camera, either of which can be used to meet practical needs. A line scan camera is often used for dynamic inspection, by which the object P, for example, is photographed while moving. Dynamic inspection ensures continuity of the inspection process.

The camera 10 is connected to the backend computer 20. Images obtained by the camera 10 are analyzed by the computer 20 in order to find defects on the surface of the object P. Preferably, the camera 10 is provided with a microprocessor (generally a built-in feature of the camera 10) for controlling the camera 10 or preprocessing images taken by the camera 10. The computer 20 obtains images via the camera 10 (or its microprocessor), preprocesses the images (e.g., through image enhancement, noise removal, contrast enhancement, edge enhancement, feature extraction, image compression, and image conversion), and subjects the resulting images to analysis by a visual software tool and algorithm in order to obtain a determination result, which is either output or stored in a database.

When automated optical inspection is carried out, dust and defects on the object P tend to be mistaken for each other, whether they are detected by the human eye or by machine vision. This is mainly because dust and defects are both defined in machine vision as noise with respect to a master slice. While there are differences between the properties of dust and those of a defect (e.g., a typical dust particle is three-dimensional and protrudes from the surface of a master slice, whereas a defect such as a scratch or a bright sub-pixel is generally located in the surface of, or inside, a master slice), both dust and defects are regarded in common machine vision as something different from a master slice, making it difficult to tell dust and defects apart using a general recognition logic. One conventional solution involves visually inspecting each machine-detected defect for verification. In cases of mass production, however, visual inspection is not as efficient, reliable, and hence suitable as machine vision, given that tens of thousands of products may be manufactured per hour.

Figure 2:
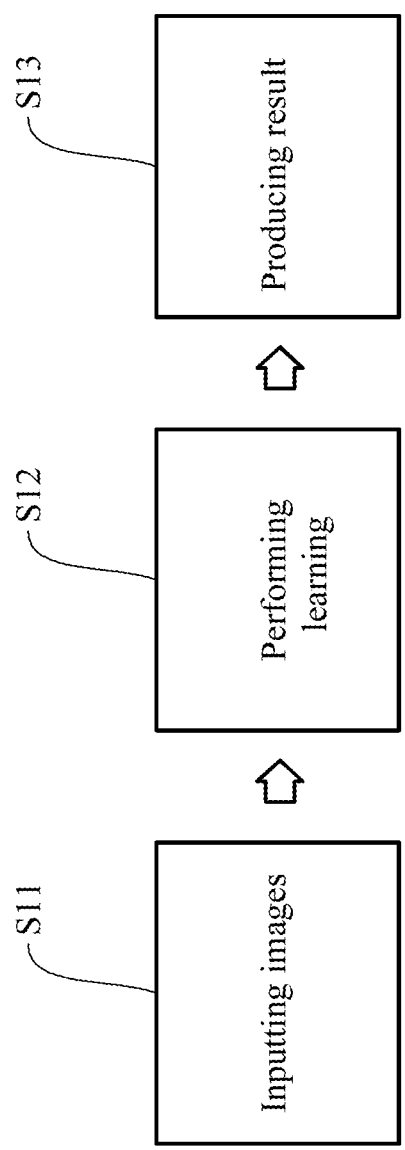
FIG. 2 shows a flowchart of deep learning.

Unlike the traditional machine learning methods, the deep learning process of the present invention has a process flow as shown in FIG. 2. To begin with, images for training a machine are input (step S11). Then, an artificial neural network with a large number of layers performs active learning to identify important feature information (step S12) and produces a training result (step S13). Deep learning requires only an artificial neural network with a large number layers because the artificial neural network will learn to find important feature information on its own. More specifically, deep learning is different from the traditional machine learning in that important features are not selected through human intervention but are identified through automatic analysis by an artificial neural network.

Preferably, the present invention includes but is not limited to modification and expansion of a LeNet model, an AlexNet model, a GoogleNet model, or a VGG (Visual Geometry Group) model. The network in use will learn to identify important feature information by itself without resorting to human selection, and this greatly shortens the time required for image analysis.

A convolutional neural network (CNN) according to the present invention is described below with reference to FIG. 3.

Figure 3:
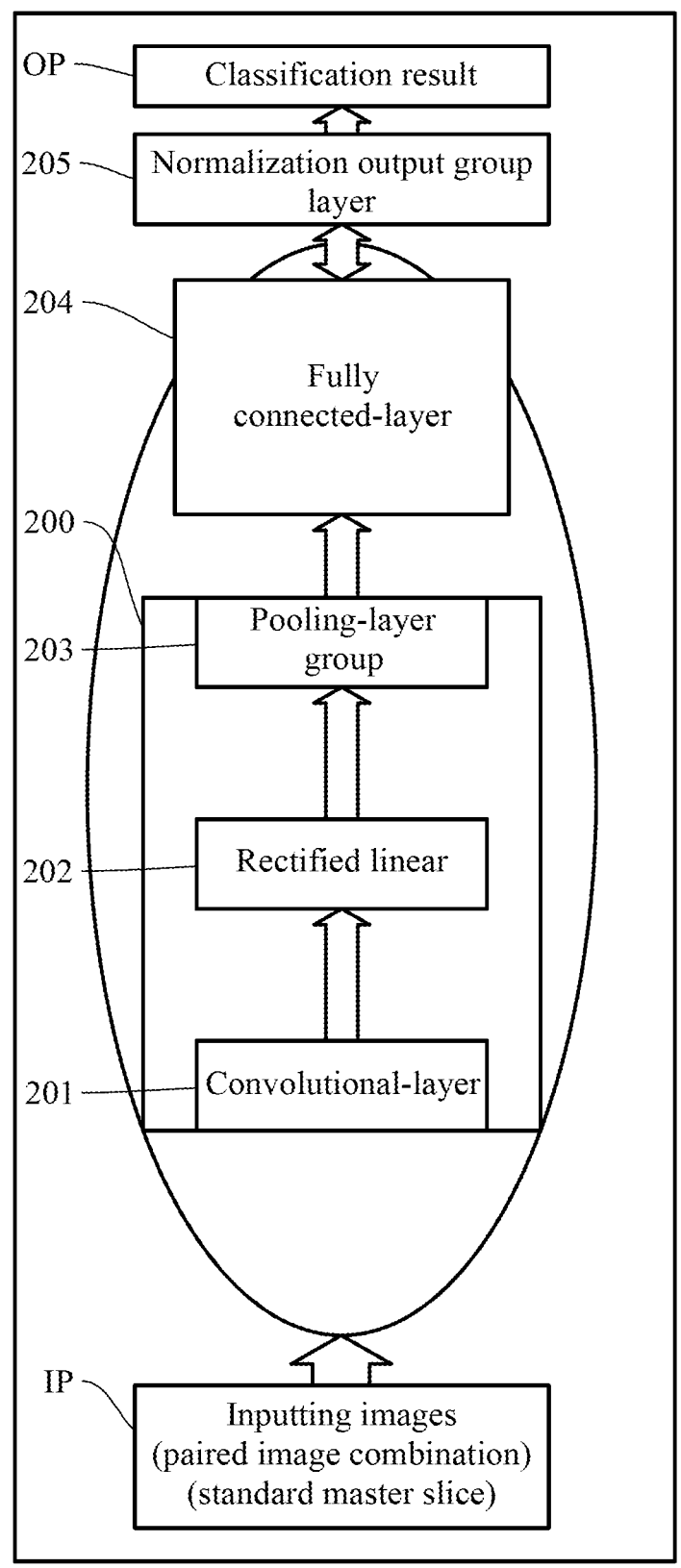
FIG. 3 shows a structural diagram of a convolutional neural network according to the invention.

As shown in FIG. 3, the convolutional neural network of the present invention essentially includes a plurality of feature extractors 200, a fully connected-layer group 204 (which may include one or a plurality of fully connected layers), and a normalization output layer 205 (for performing a softmax operation, for example). Each feature extractor 200 can be divided into a convolutional-layer group 201, rectified linear units (ReLUs) 202, and a pooling-layer group 203. Once input images IP are input, the convolutional-layer group 201, the rectified linear units 202, and the pooling-layer group 203 extract and compress important features of the images. Then, by means of weighted voting, the fully connected-layer group 204 classifies the feature images obtained. The classification result OP (which identifies each feature as non-defective, NG, defective, or otherwise) is output through the normalization output layer 205.

More specifically, the convolutional neural network performs the following steps to produce the classification result. First, the convolutional-layer group 201 selects feature images from the paired image combinations that have been input. The selected feature images are then processed by the rectified linear units 202 so that some of the pixels in the feature images are output as 0. After that, the pooling-layer group 203 performs a pooling operation on the processed feature images in order to compress and thereby simplify the processed feature images. The foregoing feature extraction process may have to be performed several times until the desired compressed image data are obtained. Then, the fully connected-layer group 204 processes the compressed feature images in order to classify them according to the weights assigned thereto. The classification result is subsequently normalized by the normalization output layer 205 as the inspection result.

Figure 4A:
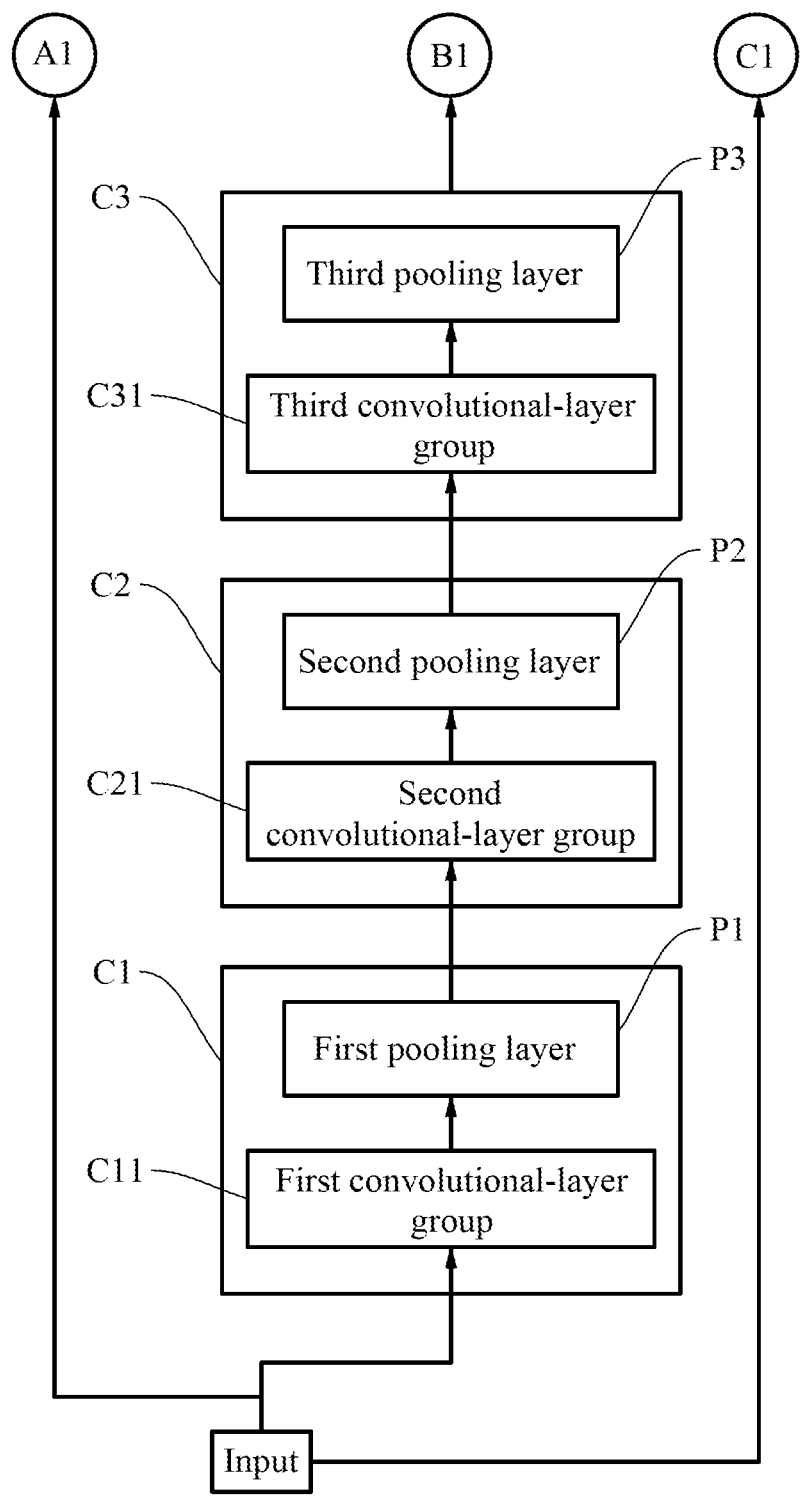
FIG. 4A shows the first parts of a block diagram of the convolutional neural network.
Figure 4B:
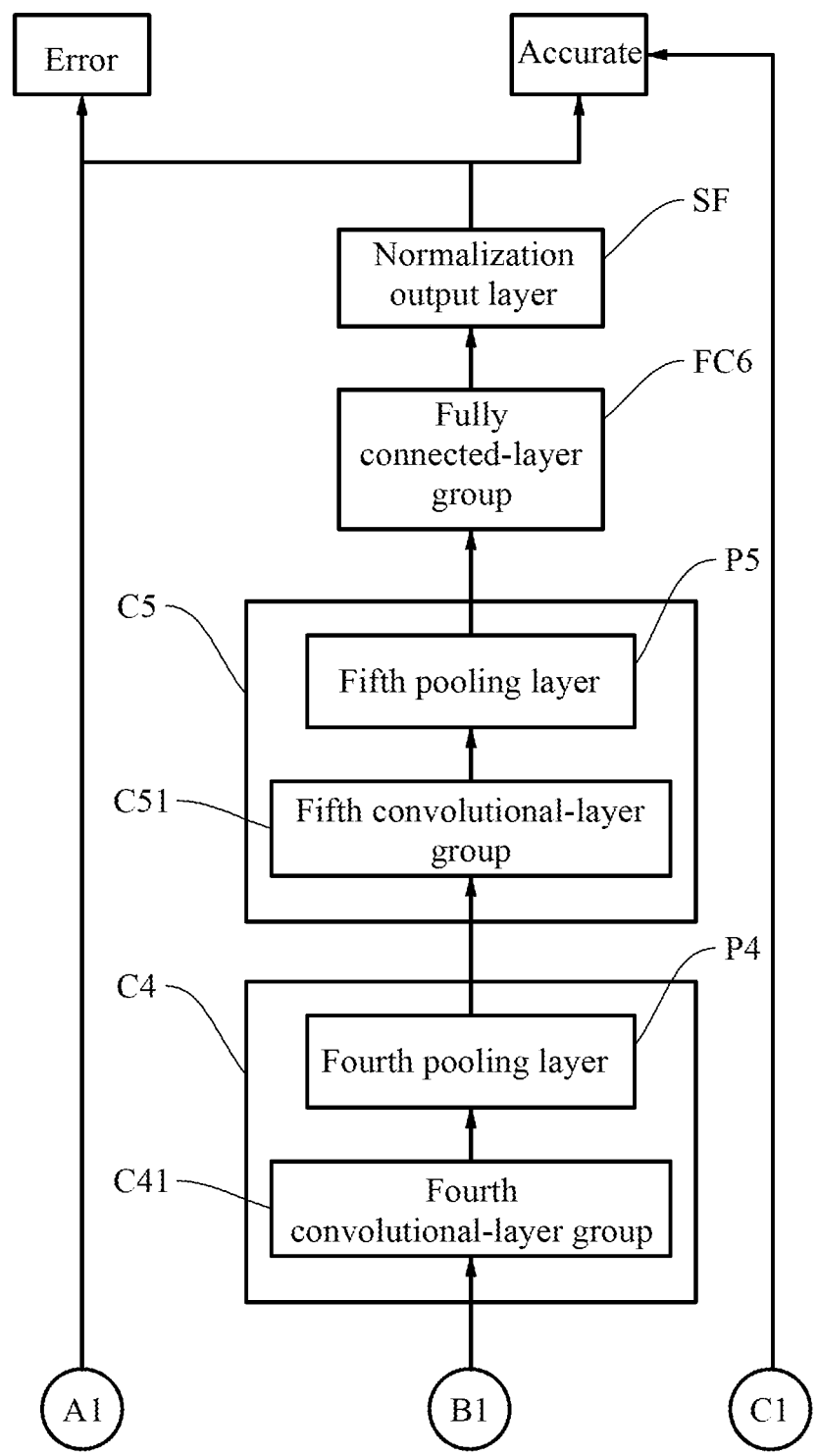
FIG. 4B show the second parts of a block diagram of the convolutional neural network.

The convolutional neural network of the present invention is further explained with reference to FIG. 4A and FIG. 4B, which show the first and second parts of a block diagram of the convolutional neural network respectively.

As shown in the drawings, the convolutional neural network includes the following components arranged sequentially in an input-to-output direction: a first feature extractor C1, whose order is determined by dataflow, and which includes a first convolutional-layer group C11 and a first pooling layer P1 for performing dimensionality reduction; a second feature extractor C2, whose order is determined by dataflow, and which includes a second convolutional-layer group C21 and a second pooling layer P2 for performing dimensionality reduction; a third feature extractor C3, whose order is determined by dataflow, and which includes a third convolutional-layer group C31 and a third pooling layer P3 for performing dimensionality reduction; a fourth feature extractor C4, whose order is determined by dataflow, and which includes a fourth convolutional-layer group C41 and a fourth pooling layer P4 for performing dimensionality reduction; a fifth feature extractor C5, whose order is determined by dataflow, and which includes a fifth convolutional-layer group C51 and a fifth pooling layer P5 for performing dimensionality reduction; a fully connected-layer group FC6 provided at the output end of the fifth feature extractor C5 to perform weight-based classification; and a normalization output layer SF for outputting the classification result (e.g., non-defective or defective).

Each of the convolutional-layer group may be composed of one or a plurality of convolutional layers arranged sequentially in an input-to-output direction and include rectified linear units arranged between the layers to lower parameter dependency and thereby reduce overfitting.

The normalization output layer SF in this embodiment includes only two channels for outputting two types of classification results respectively, namely non-defective and defective. In other preferred embodiments, more channels or fully connected layers may be provided to further classify the defects detected; the present invention has no limitation in this regard. Please note that the network structures described herein are only some preferred embodiments of the present invention but are not restrictive of the scope of the invention. During the training process, which will be detailed further below, a classification result is deemed accurate when matching the anticipated result and is deemed an error when not. In the latter case, the weights in use will be adjusted by backpropagation of the error values.

In preferred embodiments, to increase the reliability of the convolutional neural network and reduce the chance of the network detecting a false defect, the training of the convolutional neural network preferably involves providing a plurality of paired image combinations selected in advance from a plurality of inspection images and images of a standard master slice. Each paired image combination includes at least one defect-free image and at least one defect-containing image corresponding to the defect-free image. The images in each paired image combination are standardized in size.

A defect-free image refers to an image of a standard size (preferably but not limited to an image size of 120×120, 224×224, or the like) taken of a non-defective workpiece or master slice. A defect-containing image, on the other hand, refers to an image corresponding in location and size to a defect-free image but containing the image of a defect so as to serve as a reference for the defect-free image. More specifically, a defect-free image and the corresponding defect-containing image are extracted from the overlapping portions of an image of a standard master slice and of an inspection image respectively. Further, each the defect-free image and each the defect-containing image are respectively rendered into greyscale images in advance The defect-containing image in each paired image combination is classified and verified by human inspection, so the human inspection result must have certain credibility to ensure the accuracy of each training sample and prevent the machine from misjudging.

Once the training mode is started, the system inputs a plurality of paired image combinations into the convolutional neural network to train the respective weights of the fully connected layers through backpropagation. In addition to providing paired image combinations for training, another preferred embodiment involves providing at least one complete image of a standard master slice to the convolutional neural network so as to train the respective weights of at least fully connected layers through backpropagation, wherein the image of the standard master slice can improve the defect detection rate effectively.

The aforesaid backpropagation process trains the classifiers in the convolutional neural network in an iterative manner. While the convolutional neural network of the present invention has quite a lot of network layers, convergence can be achieved with only a few iterations thanks to the depth and hidden rules of the convolutional neural network.

Figure 5:
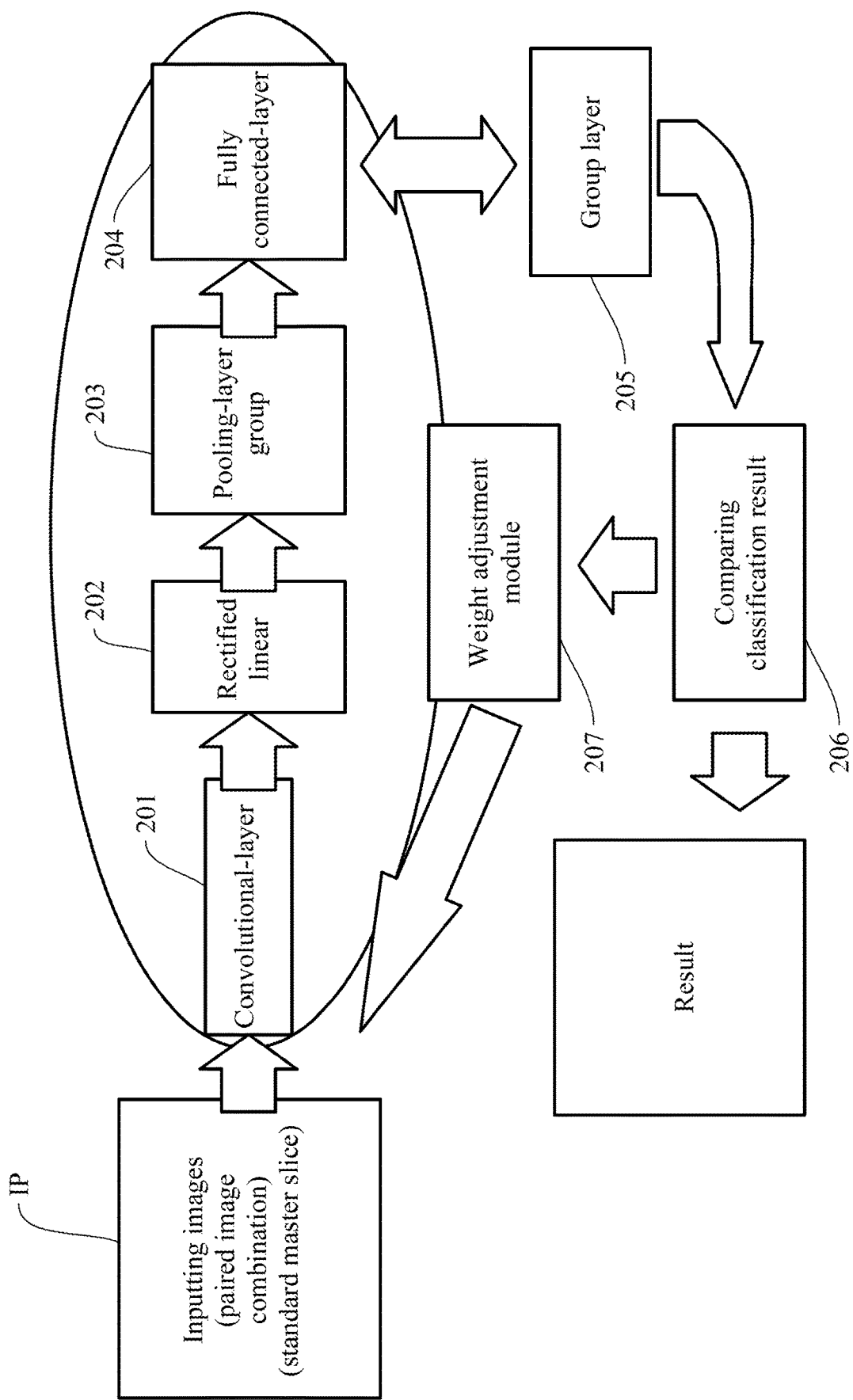
FIG. 5 shows another structural diagram of the convolutional neural network of the present invention.

The training process is now detailed with reference to FIG. 5. To start with, a plurality of input images IP (e.g., paired image combinations or images of a master slice) are input into the computer in order to train the computer sequentially with each input image IP and the corresponding result. Each image pair includes two types of parameters, namely values input into the network (i.e., image data) and an anticipated output (e.g., non-defective, NG, defective, or other defect types). The input values go through the convolutional-layer group 201, the rectified linear units 202, and the pooling-layer group 203 of the convolutional neural network repeatedly for feature enhancement and image compression and are classified by the fully connected-layer group 204 according to weights, before the classification result is output from the normalization output layer 205. A comparison module 206 compares the classification result (i.e., inspection result) with the anticipated output and determines whether the former matches the latter. If no, the comparison module 206 outputs the errors (i.e., differences) to a weight adjustment module 207 in order to calculate and adjust the weights of the fully connected layers by backpropagation. The steps described above are repeated until the training is completed.

Figure 6:
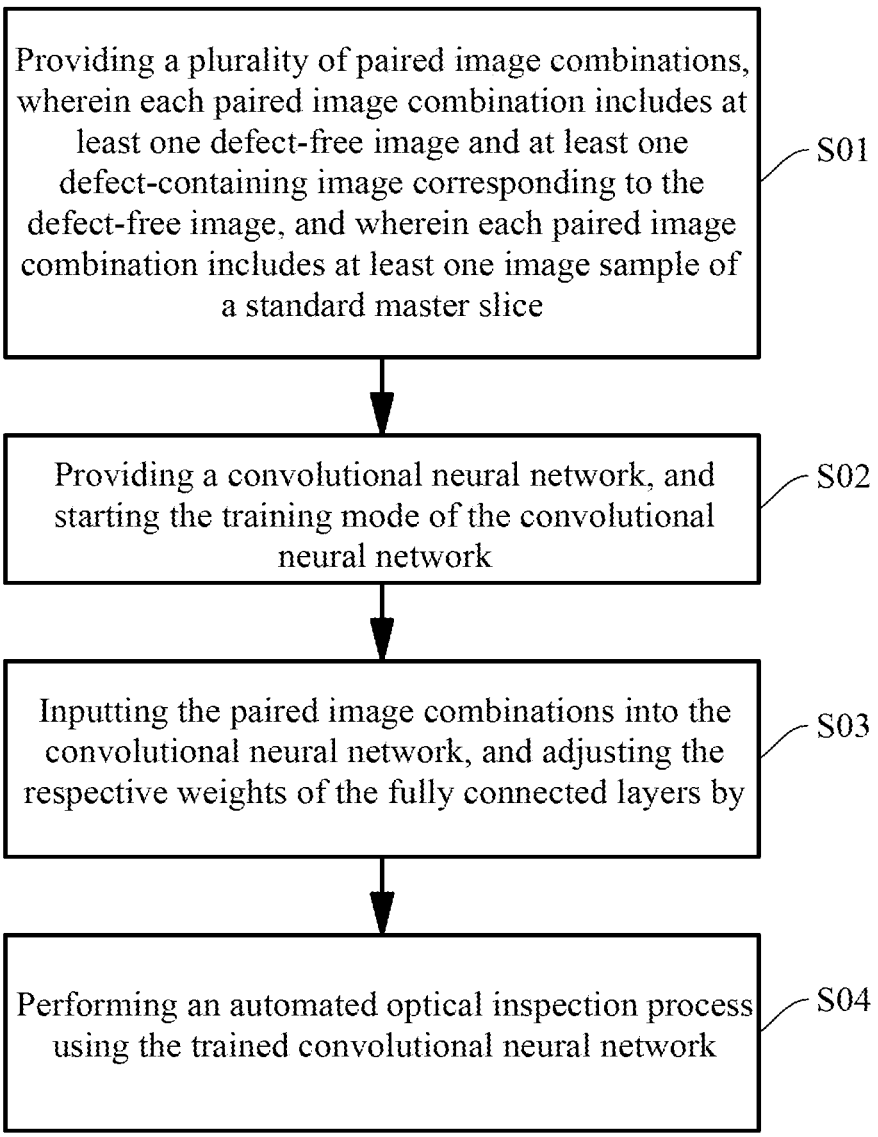
FIG. 6 shows the flowchart of an automated optical inspection method according to the invention.

A detailed description of the automated optical inspection method using deep learning of the present invention is given below with reference to FIG. 6. The optical inspection method using deep learning includes the steps of:

providing a plurality of paired image combinations, wherein each paired image combination includes at least one defect-free image and at least one defect-containing image corresponding to the defect-free image, and wherein each paired image combination includes at least one image sample of a standard master slice (step S01);

providing a convolutional neural network to start the training mode of the convolutional neural network (step S02);

inputting the paired image combinations into the convolutional neural network, and adjusting the respective weights of the fully connected layers by backpropagation to complete training of the convolutional neural network (step S03); and performing an automated optical inspection process using the trained convolutional neural network (step S04).

Figure 7:
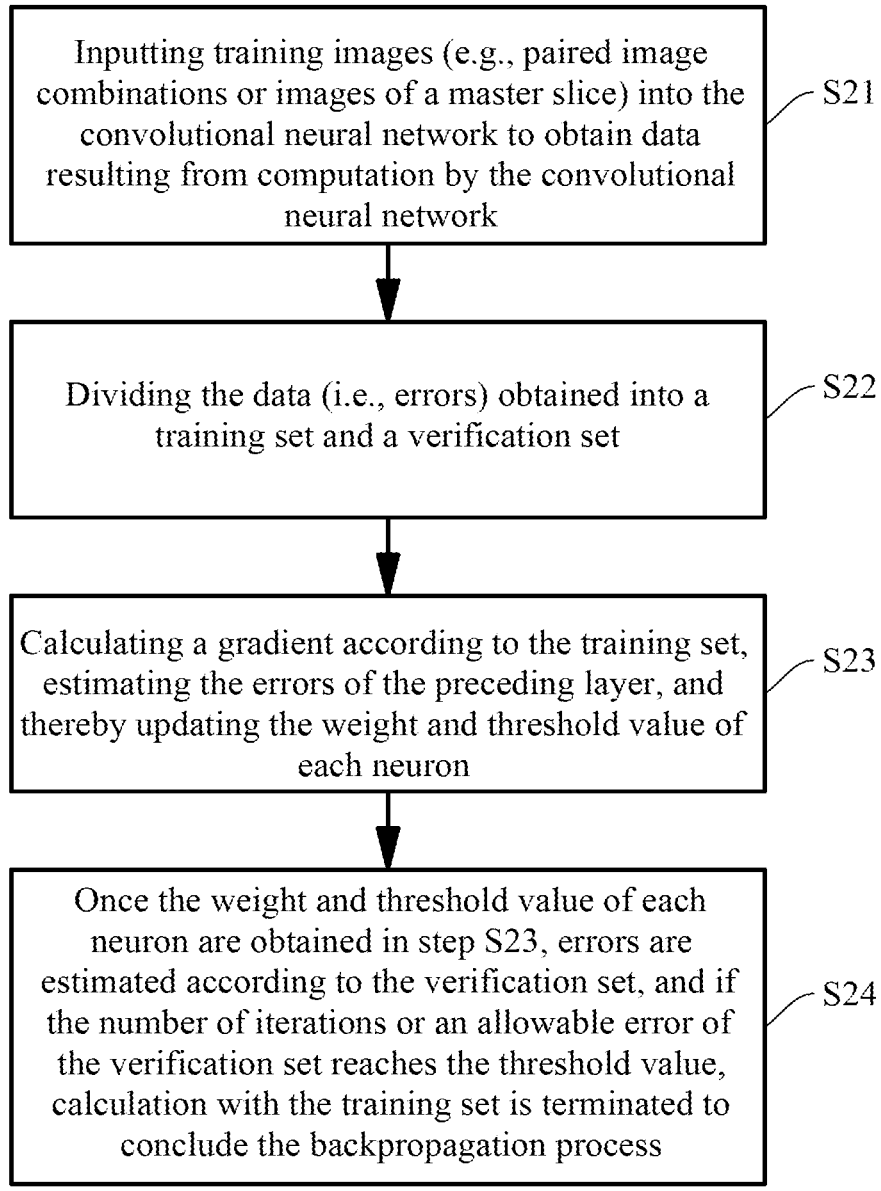
FIG. 7 shows a flowchart of backpropagation according to the invention.

A detailed description of the backpropagation process is given below with reference to FIG. 7. The backpropagation process includes the steps of:

inputting training images (e.g., paired image combinations or images of a master slice) into the convolutional neural network to obtain data resulting from computation by the convolutional neural network (step S21);

dividing the data (i.e., errors) obtained into a training set and a verification set (step S22); and calculating a gradient according to the training set, estimating the errors of the preceding layer, and thereby updating the weight and threshold value of each neuron (step S23);

wherein once the weight and threshold value of each neuron are obtained in step S23, errors are estimated according to the verification set, and if the number of iterations or an allowable error of the verification set reaches the threshold value, calculation with the training set is terminated to conclude the backpropagation process (step S24).

According to the present invention, paired image combinations or images of a master slice are input into the convolutional neural network to train the convolutional neural network, thereby lowering the overkill rate and increasing the defect detection rate and accuracy of automated optical inspection effectively. The method (or steps) of the present invention can be implemented via a computer-readable storage medium such as an optical disc, a hard drive, or a semiconductor memory device and be loaded into an electronic device through the computer-readable storage medium in order to be accessed by the electronic device.

The method (or steps) of the present invention can also be implemented via a computer program product that is stored in a hard drive or other memory device of a network server such as App Store, Google Play, Windows Marketplace, or other similar online application program release platforms.

As above, the present invention can effectively increase the filtration rate of false defects in a deep learning process, shorten the training time, minimize the number of samples required, and reduce the amount of data of the resulting model. The invention is also effective in increasing the defect detection rate and accuracy of optical inspection and can thereby enhance inspection efficiency and lower the associated costs.

The above is the detailed description of the present invention. However, the above is merely the preferred embodiment of the present invention and cannot be the limitation to the implement scope of the present invention, which means the variation and modification according the present invention may still fall into the scope of the invention.

What is claimed is:

1. An automated optical inspection method using deep learning, comprising the steps of:
providing a plurality of paired image combinations, wherein each said paired image combination includes at least one defect-free image and at least one defect-containing image corresponding to the defect-free image;
providing a convolutional neural network to start a training mode of the convolutional neural network, wherein the convolutional neural network is used for producing an inspection result of non-defective or defective or an inspection result of defects classification;
inputting the plurality of paired image combinations into the convolutional neural network, and adjusting a weight of at least one fully connected layer of the convolutional neural network through backpropagation to complete the training mode of the convolutional neural network; and
performing an optical inspection process using the trained convolutional neural network.

2. The automated optical inspection method using deep learning of claim 1, wherein each paired image combination includes at least one image sample of a standard master slice.

3. The automated optical inspection method using deep learning of claim 1, further comprising providing at least one complete image of a standard master slice to the convolutional neural network in order to adjust the weight of at least one fully connected layer through the backpropagation.

4. The automated optical inspection method using deep learning of claim 1, wherein the defect-containing image in the paired image combination is classified and verified by human inspection.

5. The automated optical inspection method using deep learning of claim 1, wherein the defect-free image and the corresponding defect-containing image are extracted from the overlapping portions of an image of a standard master slice and of an inspection image respectively.

6. The automated optical inspection method using deep learning of claim 5, wherein each said defect-free image and each said defect-containing image are respectively rendered into greyscale images in advance before the training mode started.

7. The automated optical inspection method using deep learning of claim 5, wherein the backpropagation comprises:
inputting training images into the convolutional neural network to obtain data;
dividing the data into a training set and a verification set;
calculating a gradient according to the training set, estimating an error of a preceding layer, and thereby updating a weight and a threshold value of each neuron; and
estimating an error according to the verification set, and terminating calculation with the training set when the number of iterations or an allowable error reaches the threshold value.

8. The automated optical inspection method using deep learning of claim 5, wherein the convolutional neural network performs the following steps:
selecting a feature image from the input paired image combinations through a plurality of convolutional layers;
processing the selected feature image with rectified linear units so that certain pixels in the feature image are output as 0;
performing pooling on the processed feature image in order to compress and thereby simplify the processed feature image; and
processing the compressed feature image with the fully connected layer in order to classify the compressed feature image according to the weights, and normalizing a classification result to obtain an inspection result.

9. An automated optical inspection apparatus, comprising:
an image-capture device for obtaining images of a workpiece;
a computer comprising a convolutional neural network, wherein the convolutional neural network is used for producing an inspection result of non-defective or defective or an inspection result of defects classification, which is trained as the following steps:

providing a plurality of paired image combinations to the computer, wherein each said paired image combination includes at least one defect-free image and at least one defect-containing image corresponding to the defect-free image;

start a training mode of the convolutional neural network; and inputting the plurality of paired image combinations into the convolutional neural network, and adjusting a weight of at least one fully connected layer of the convolutional neural network through backpropagation to complete the training mode of the convolutional neural network; and a computation device coupled to the image-capture device and the computer, and configured to perform an optical inspection process on the workpiece using a trained convolutional neural network.

10. The automated optical inspection apparatus of claim 9, wherein the convolutional neural network comprises, arranged sequentially in an input-to-output direction:

a first feature extractor having a first convolutional-layer group and a first pooling layer for performing dimensionality reduction;

a second feature extractor coupled to the first feature extractor, wherein the second feature extractor has a second convolutional-layer group and a second pooling layer for performing dimensionality reduction;

a third feature extractor coupled to the second feature extractor, wherein the third feature extractor has a third convolutional-layer group and a third pooling layer for performing dimensionality reduction;

a fourth feature extractor coupled to the third feature extractor, wherein the fourth feature extractor has a fourth convolutional-layer group and a fourth pooling layer for performing dimensionality reduction;

a fifth feature extractor coupled to the fourth feature extractor, wherein the fifth feature extractor has a fifth convolutional-layer group and a fifth pooling layer for performing dimensionality reduction;

one or a plurality of fully connected layers provided at an output end of the fifth feature extractor to perform classification according to the weight of each said fully connected layer; and a normalization output layer for outputting a classification result.

11. A non-transitory computer-readable storage medium storing a computer program comprising instructions configured to perform the deep-learning automated optical inspection method using deep learning of claim 1.

* * * * *